United States Patent [19]

Bridgeford

[11] 4,226,264

[45] Oct. 7, 1980

[54] ELASTIC AMYLOSE POLYMERS

[75] Inventor: Douglas J. Bridgeford, Champaign, Ill.

[73] Assignee: Teepak, Inc., Chicago, Ill.

[21] Appl. No.: 609,476

[22] Filed: Sep. 2, 1975

Related U.S. Application Data

[63] Continuation of Ser. No. 409,528, Oct. 25, 1973, abandoned.

[51] Int. Cl.³ .............................................. A22C 13/00
[52] U.S. Cl. ................................ 738/118.1; 426/138; 426/277
[58] Field of Search ............... 426/138, 140, 276, 277, 426/284, 282, 279; 99/175, 176; 138/118.1

[56] References Cited

U.S. PATENT DOCUMENTS

| | | | |
|---|---|---|---|
| 2,817,592 | 12/1957 | Novak et al. | 426/284 |
| 3,007,832 | 11/1961 | Milne | 156/80 |
| 3,034,852 | 5/1962 | Nishihara | 264/202 |
| 3,245,810 | 5/1966 | Heiss | 106/27 |
| 3,269,851 | 8/1966 | Tu | 106/125 |
| 3,314,861 | 4/1967 | Fujii | 264/202 |
| 3,314,861 | 5/1967 | Fujii | 435/69 |
| 3,640,735 | 2/1972 | Oppenheimer | 138/118.1 |
| 3,658,561 | 5/1972 | Rose | 426/284 |
| 3,674,506 | 7/1972 | Schilling et al. | 426/284 |
| 3,695,904 | 10/1972 | Coleman | 427/202 |

OTHER PUBLICATIONS

Shokuhin Kogyo, 1971, 14(14), 33–38, Japan Kokura, Tokue (Nichiden Chemical Co., Ltd.
Carbohydrate Research, 19687(4), 414–420, Banks.
Biopolymers, 1969, 8(3), 313–323, Sundarajan.
Biopolymers, 1(6), 527–544, 1963, Rao.
Hawley, The Condensed Chemical Dictionary, New York, 1971, p. 316.

Primary Examiner—Richard R. Stearns
Attorney, Agent, or Firm—Paul Shapiro; Joseph E. Kerwin

[57] ABSTRACT

Highly elastic films, filaments, and shaped articles can be prepared from amylose by forming a dispersion or solution of amylose in an appropriate liquid vehicle under conditions in which the molecular conformation of amylose is substantially helical, then forming a shaped article, film, or filament from the dispersion or solution and finally crosslinking the amylose with a crosslinking agent, the crosslinking agent being present in a proportion for providing an average of about 1 crosslink per 500 amylose monomer units to about 1 crosslink per 10 amylose monomer units.

14 Claims, 2 Drawing Figures

ELASTIC AMYLOSE POLYMERS

This is a continuation of Ser. No. 409,528 filed Oct. 25, 1973, now abandoned.

BACKGROUND OF THE INVENTION

A review of the patent art and literature will reveal that substantial work has been conducted to produce films, filaments, and shaped articles including impregnated fabrics such as paper from amylose and amylose derivatives.

Amylose is a linear polymer found widespread in many types of plants. It can be obtained by the fractionation of starch which varies in content from a few percent in some types to over 60% in specialty high amylose starches. Amylose is a polymer and consists of chains of $\alpha$-D-glucopryanose units linked (1→4) and has a molecular weight of from about 50,000–200,000. Its structure is similar to that of cellulose except that it is alpha linked whereas cellulose is beta linked. Apparently, because of this difference in chemical linkage, cellulose is a relaxed linear chain which crystallizes into fibrous materials whereas amylose is a coiled of spiral chain which is capable of helical conformation and does not crystallize into a fibrous material.

The many similarities between cellulose and amylose permit similar processes to be carried out and products to be made. For example, similarly to cellulose, amylose can be made into filaments by making esters of amylose, e.g., amylose acetate, amylose acetate-butyrate and spinning these esters into fibers. Amylose can also be made into films in like manner as cellulose which have been used as a packaging material for detergents, as protective coatings for food packaging and in general where self-supporting films are desired. For example, one type of film can be made by forming amylose xanthate employing a process similar to the viscose process for making cellulose films and casings and then regenerating the amylose.

Even though there has been considerable interest in producing films, filaments, and shaped articles from amylose and amylose derivatives, the films have not been widely used. Although the material is attractive economically and further because it is edible whereas cellulose is not, the films, filaments, etc., have not had the desired physical properties to make the products widely accepted on a commercial basis. One of the reasons for non-acceptance is that generally films and filaments have been extremely brittle. Particularly in the artificial sausage casing field, the films have not had sufficient elasticity to withstand the rigid stuffing conditions required for sausage manufacture and, therefore, suffered a high degree of breakage in the stuffing operation. Secondly, the casing, presumably because of the lack of desirable elasticity, did not shrink with the sausage during cooking. The homemaker found these casings, which extended from the sausage, to be unsightly and undesirable.

DESCRIPTION OF THE PRIOR ART

Amylose films having a high degree of transparency, flexibility, tensile strength, and water insolubility have been prepared by reacting an amylose film with a hydroxyl-reactive compound in order to produce a surface which is relatively hydrophobic compared to the unreacted film. Hydroxyl-reactive compounds capable of modifying the amylose film and imparting hydrophobic properties to the surface include fatty acid anhydrides such as acetic, propionic, butyric, succinic, and phthalic anhydrides; acylhalides such as succinyl chloride and acetyl chloride; isocyanates such as aromatic and alkyl isocyanates, e.g., phenyl and methyl isocyanates and metallic or metalloid halides such as phenyldichlorophosphine oxide and dimethyldichlorosilane.

Amylose films have been prepared from an amylose-water mixture by heating the mixture under pressure to a temperature of at least 250° F. and forming it into a paste or plastic mass and then extruding this paste as a self-supporting film at about 210° F. Elongation at break was reported at 4–12%.

Amylose films suitable as packaging materials have been prepared from an amylose-water medium in which the medium has been saturated with a chemical compound known to form molecular complexes with the amylose. Such complexing compounds included aliphatic alcohols such as butanol, pentanol, diethyl-2-ethoxy ethanol, and organic bases such as pyridine.

Films, tubes, and foils have been prepared from solutions of amylose or amylose starch in water and formaldehyde. In this process, the pH of the solutions for forming the final product is adjusted to about 2.5–3.5 and then heated to 120° C. for about five minutes. The solutions are extruded and passed into a coagulating vessel thereby forming a film or filament.

Starches, which include from about 20–40% of amylose, by weight, have been insolubilized by crosslinking with hydroxy reactable compounds. For example, starch has been crosslinked with epichlorohydrin under alkaline conditions and with difunctional isocyanates.

Another type of insolubilized starch which is resistant to water has also been prepared by dispersing starches such as corn, wheat, tapioca, and others in water at elevated temperatures, acidifying the slurry to a pH of about 4.5–6, reducing the temperature to about 60° C. and then crosslinking with a dialdehyde polysaccharide in a proportion of from about 2.5–10%.

None of the references reviewed thus far have been addressed to the problem of insufficient elasticity in films, filaments, etc., or artificial sausage casings made from amylose.

SUMMARY OF THE INVENTION

It has been found that films, filaments, and shaped articles having a high degree of elasticity and strength can be made from amylose. The method comprises: forming a mixture of amylose and a liquid vehicle under conditions in which the molecular conformation of the amylose polymer is substantially in the helical form, forming a shaped article, filament, or film from the mixture and then crosslinking amylose or a derivative thereof with a polyfunctional crosslinking agent preferably having at least 3 carbon atoms in the structure while the molecular conformation is still in the helical form. The proportion of crosslinking agent should be sufficient to produce about 1 crosslink per 500 monomer units to about 1 crosslink to 10 monomer units in the resulting polymer.

By crosslinking the amylose with a crosslinking agent, preferably one having at least 3 carbon atoms in the structure, and at a low crosslink density, e.g., a D.S. of less than 0.1, while the molecular conformation of the amylose is substantially in the helical form, elastic properties are imparted to the resulting film, filament, or shaped article. In fact, the elasticity of these polymers is significantly greater than films, filaments, or shaped articles produced by the conventional methods.

DRAWINGS

DESCRIPTION OF THE PREFERRED EMBODIMENTS

Figure 1:
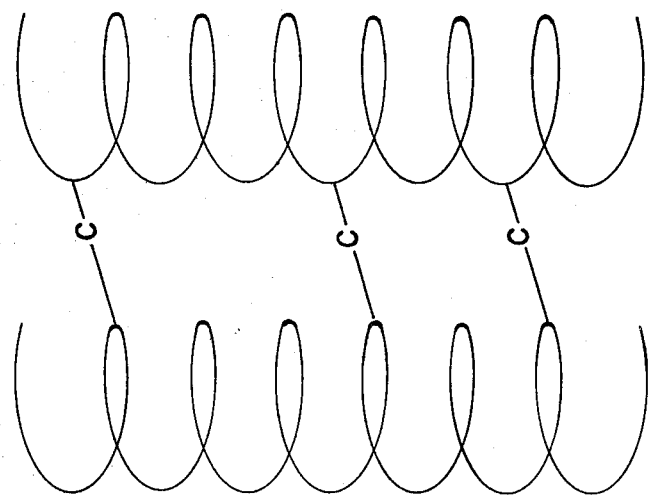
FIG. 1 is a sketch which is believed to explain the theory of the invention and more particularly of amylose molecules crosslinked when in the helical state.

Amylose, because of its molecular makeup, can have several conformations. Under certain conditions, the molecular conformation may be helical; under others it may exist as a random coil on a helical backbone or it may exist as a transition between the two. For example, in alkyl sulfoxides and in an aqueous acidic solution having a pH below about 6.5, amylose generally exists in the helical conformation. In aqueous media having an alkaline pH it exists as a random coil.

Based on this knowledge, it was thought that if amylose molecules or its derivatives while in the helical conformation, were crosslinked with an appropriate crosslinking agent a resultant polymer having the molecules arranged and stabilized in the helical conformation would be formed. The helical conformation of the polymer then presumably would provide for a plurality of "miniature" springs and respond similarly. If this were true, the "miniature" springs would enhance elasticity of the polymer because the molecules could elongate when subjected to load and yet because of its "spring like" structure revert to its original state when the load was removed.

On the other hand, if amylose were crosslinked while in the random coil conformation as opposed to the helical conformation, elasticity probably would be reduced. Two factors in the film probably would inhibit elasticity, one is that the molecules would not be present as a series of "miniature springs" which are interconnected; but as a random coil intramolecularly crosslinked and the other is that the elasticity would be reduced because of increased hydrogen bonding between the molecules. This aspect of inelasticity has been shown in the prior art.

The term "amylose" is meant to include amylose by itself, amylose derivatives, and additional components selected from the group consisting of polypeptides and polymeric polyols. The additional components can be present in a proportion not exceeding 60% by weight if present in a helical conformation under the same conditions in which the amylose is in the helical conformation. If the additional components are not in the helical conformation simultaneously with the amylose then not more than 30% by weight of the additional components can be present in the final product based on the weight of the amylose. For sausage casing manufacture it is preferred the polymeric polyol and/or polypeptide content does not exceed 10% by weight of the product.

Polypeptides which comprise chains of amino acid residues and make up protein molecules can be used in conjunction with amylose as a separate polymer or polymeric component for making desired elastic products. One of the interesting features about polypeptides is that many can undergo molecular change to a helical conformation and, in many instances, amylose and the polypeptide will be in the helical conformation under the same conditions. A polypeptide or protein capable of helical conformation with amylose is preferred as it appears the elasticity of the products is significantly better than products made employing a polypeptide in which the molecular conformation is not helical and the amylose conformation is helical. Examples of polypeptides suitable for making elastic products include collagen, elastin, gelatin, soy protein, polyaspartic acid, casein, poly $\alpha$ benzyl glutamate, polyglutamic acid, and poly $\alpha$ lysine.

Polymeric polyols suitable for practicing the invention primarily include the polysaccharides containing a plurality of anhydroglucose units. However, many of these polymeric polyols, particularly polysaccharides, have a complex conformation and exist as a random coil and not as a helical conformation. Amylopectin, which makes up a substantial proportion of starch, is an example of such a polysaccharide and exists in the random coil conformation. Sometimes these polymeric polyols can impart desirable properties to the amylose film and can be used in limited quantities. Examples of polymeric polyols for practicing the invention include polysaccharides such as starch, sugar, cellulose, amylopectin, glycogen, polyvinyl alcohol, polyallyl alcohol, and the like.

The liquid vehicle to be used for making the dispersion or solution of amylose should be (1) chemically non-reactive or inert to amylose and the crosslinking agent in order to prevent crosslinking of the amylose with the carrier and (2) of the type in which the amylose molecule can reorient to the helical conformation as opposed to the random coil. Virtually, any of the liquid mediums which will complex with amylose are chemically inert to amylose and permit the amylose molecule to reorient to form a helical conformation. Exemplary of such liquid mediums for practicing the invention include an aqueous medium having a pH below about 7 but not substantially below 2, aliphatic alcohols such as butanol, pentanol, 2-ethoxy ethanol, and diethyl-2-ethoxy ethanol, and alkyl sulfoxides of the formula $RR_1SO$ wherein R is methyl and $R_1$ is hydrogen or a methyl group.

Preferably the liquid medium is an alkyl sulfoxide such as dimethyl sulfoxide as the solubility of amylose and many of the preferred crosslinking agents is much higher in this medium than in water. These features of the liquid carrier appear to have an added effect on the elasticity of the polymers as usually corresponding polymers produced in an aqueous medium have substantially less elasticity.

Figure 2:
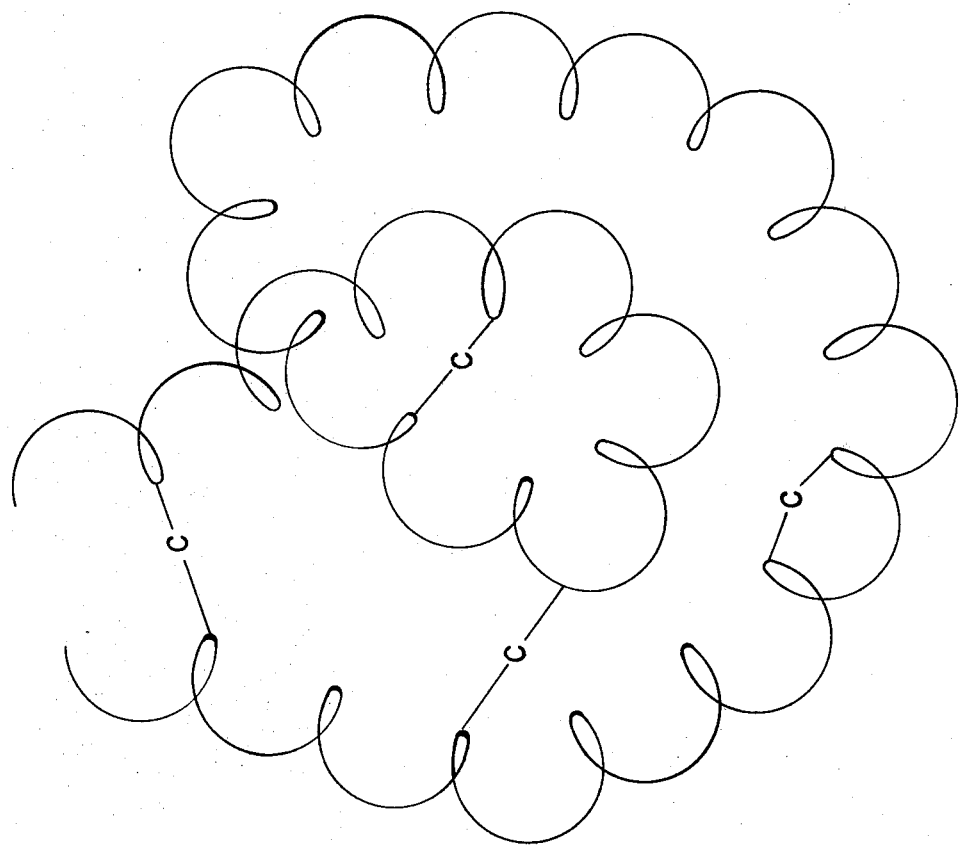
FIG. 2 is a sketch of what is believed to be the structure of amylose molecules crosslinked when present as a random coil on a helical backbone.

In the above liquid media at an appropriate temperature, e.g., 10°-30° C., amylose is substantially in the helical conformation. This is reported in the literature. In practicing the invention, it is preferred that at least about 80% of the amylose molecules are in the helical conformation at the time of crosslinking. When these conditions are present and when crosslinked, it is believed a product pictorially described in FIG. 1 is produced. On the other hand, if these conditions do not exist, the amylose molecule is in the random coil conformation and a product pictorially described by FIG. 2 is believed to result. The letter "C" in the FIGS. 1 and 2 indicates the crosslink sites and agent bridging the molecules.

The polyfunctional crosslinking agents which can be used for crosslinking amylose are virtually endless. Generally, they are difunctional as such functionality is necessary to form a bridge between the amylose molecules. The crosslinking agent preferably should be substantially linear. It should also be substantially soluble in the liquid medium so that it will be in a form suitable for reaction. It has been found that when the crosslinking agent is highly branched, as in a dialdehyde polysaccharide, the desired elasticity in products made from amylose, particularly in sausage casings, is less than is obtained in amylose polymers made with linear crosslinking agents, e.g., a copolymer of maleic anhydride and methyl vinyl ether, even though both crosslinking agents are large in terms of carbon atoms.

Several types of functional groups are capable of reacting with a functional group on the amylose molecule, i.e., the hydroxy group and may be included on the crosslinking agents. These functional groups are well known to those skilled in the art. Typical functional groups which can react directly with the hydroxyl group include an isocyanate, a carboxylic acid, an acyl halide, an epoxide, an aldehyde, an anhydride, an imine, and the like. It is also possible to crosslink the amylose molecule by forming pendant groups from the alcohol groups which are reactable with the pendant functional group to achieve crosslinking between the amylose molecule.

Typical isocyanate crosslinking agents are the alkylene and cycloalkyl diisocyanates such as hexamethylene diisocyanate, butylene diisocyante, methylene dicyclohexyl p,p' diisocyanate, and the like. Aromatic polyfunctional isocyanates such as tolylene diisocyanate and phenylene diisocyanate can also be used.

Acid crosslinking agents having at least 2 carboxylic acid groups can be used for crosslinking amylose molecules to form elastic polymers. Examples of these acids include saturated acids such as adipic, succinic, phthalic, isophthalic, glutaric, malonic, sebacic, camphoric; alpha-beta unsaturated dicarboxylic acids such as fumaric, maleic, itaconic, and citraconic; and dimer acids such as dimerized oleic and maleinized copolymers such as maleinized methyl vinylether and maleinized butadiene.

Alpha-beta unsaturated monocarboxylic acids also can be used for crosslinking amylose molecules but the method of crosslinking is different than where difunctional acids are employed. Crosslinking can be effected by a two-fold reaction, the first being a condensation reaction between the carbonyl group on the acid with the alcohol group on the amylose molecule and the second being a polymerization group between the vinyl linkages. Examples of alpha-beta mono unsaturated acids include allylic, methacrylic, and acrylic.

Acid anhydrides can be used equally as well as the acid crosslinking acids recited above as the anhydride group can be hydrolyzed to form an acid or directly reacted. Examples of appropriate anhydrides include cinnamic, succinic, phthalic, glycolic, maleic, fumaric, and the like.

Acyl halides can also be used for effecting crosslinking of the amylose molecule. The acylhalides react similarly to the acid and the acid anhydride crosslinking agent. However, as might be expected, when using in acylhalide, it is generally necessary to employ a halide acceptor to remove the by-product halide as it is produced. These acylhalides which can be used for practicing the invention include corresponding acylhalides of the carboxylic acids listed in the previous section.

Epoxides can also be used as a crosslinking agent for making the amylose polymers. Preferably, the epoxides are prepared by reacting an epichlorohydrin with a polyfunctional alcohol such as Bisphenol A, a cycloaliphatic alcohol, or amino phenol. Examples of epoxides include Bisphenol A-epichlorohydrin resin, cycloaliphatic epoxycarboxylate where the aliphatic portion has from about 1-3 carbon atoms, and bis (2,3 epoxycycloaryl) ethers, vinyl cyclohexene dioxide, or phenolic novolak-epichlorohydrin and diepoxydicyclohexyl carboxylate.

Another class of crosslinking agents are the dialdehydes. They can react with the hydroxy group on the amylose molecule to form an acetal bridge. Examples of dialdehydes which can be used as a crosslinking agent include glyoxal, glutaraldehyde, dialdehyde polysaccharides, e.g., dialdehyde gum arabic, dialdehyde alginic acid and dialdehyde starch.

Xanthate groups can also be formed on the amylose molecule and subsequently reacted to crosslink the amylose. For example, the xanthate can be reacted with an oxidant, e.g., iodine, to form a xanthide crosslink or reacted with a difunctional halide to form a bridged xanthate. Xanthate groups can be formed on the amylose molecule by first reacting the amylose with alkali metal hydroxide to form alkali amylose and then reacting the alkali amylose with carbon disulfide to form alkali amylose xanthate. The xanthate groups then can be joined by reaction with difunctional halides such as dichloropropanol, dichlorobutanol, dichloropentanol, and activated difunctional halides such as butylene dichloride. The iodine has a tendency to form a complex with the amylose structure and inhibit elasticity of the resultant polymer.

Examples of short chain crosslinking agent which can be used but are not preferred include formaldehyde, propylene oxide, ethylene oxide, ethylene imine and propylene imine. These short chain crosslinking agents do not keep the hydroxyl groups on the amylose molecule sufficiently separated to minimize hydrogen bonding.

The crosslinking agent preferably should have at least 3 carbon atoms in the structure as opposed to a shorter chain to provide significant elasticity to the polymer. As mentioned earlier, amylose has a considerable amount of hydrogen bonding in the molecule due primarily to the hydroxyl groups and their position. The 6–8 anhydroglucose units in the helical turn permit close relationship between the hydroxyl groups and substantial bonding between hydrogens. Hydrogen bonding is believed to act similarly to an increased portion of a crosslinking agent, thereby making the polymer film, filament, or shaped article more rigid and brittle. Crosslinking agents having at least 3 carbons in the structure to keep the amylose molecules spread sufficiently to minimize such bonding.

A further belief is that a crosslinking agent having less than about 3 carbon atoms in the structure may tend to crosslink the amylose molecule on the intra-molecular basis, i.e., between coils as opposed to an intermolecular basis. If the former occurs, then the elasticity of the polymer probably will be substantially reduced because intra-molecular crosslinking substantially reduces the ability of the helical coil to extend. Also, there can be no coaction with other amylose molecules in the helical form which as a unit tend to increase the strength and elasticity of the polymer film. This aspect is exemplified in the case where formaldehyde is used as the crosslinking agent for amylose. Amylose polymers crosslinked with formaldehyde generally have a lower degree of elasticity than the polymer crosspondingly crosslinked with a linear crosslinking agent having at least 3 carbon atoms in the structure. However, films and filaments made by crosslinking with formaldehyde generally have slightly better elasticity than non-crosslinked films.

Preferred polymeric films, filaments, and shaped articles having a significant degree of elasticity are produced when the crosslinking agent is linear and not highly branched. A highly branched crosslinking agent such as a dialdehyde starch or an aryl branched polyepoxide presumably tends to interfere with the mobility of the helical molecules and decrease the elasticity of the polymer.

The crosslinking agents should be used in a proportion of about 1 crosslink per 500 amylose monomer units to about 1 crosslink per 10 amylose monomer units. When less than about 1 crosslink per 500 amylose monomer units is used, it appears there is insufficient crosslinking agent to tie the amylose molecules together to keep them from reorienting to a non-helical conformation. Further, there is an insufficient number of crosslinks for tying the amylose molecules together to provide desired coaction between them to enhance the elasticity and film strength. When a crosslinking is used in a proportion so that more than 1 crosslink per 10 amylose monomer units is present, the polymer loses much of its elasticity due to the large proportion of crosslink sites. As might be expected, the increase in crosslink sites tends to tie the molecules together in such a way as they cannot stretch or expand when subjected to load. For good results with respect to elasticity of products produced from amylose and amylose derivatives containing up to 30% by weight of the polymeric polyol or polypeptide, a crosslinking agent is used in proportion to supply about 1 crosslink per 200 amylose monomer units to about 1 crosslink per 50 amylose monomer units in the structure. Generally, this will provide sufficient elasticity in the resulting polymer to be acceptable for manufacture of sausage casings.

The polymer films, filaments, or fibers and shaped articles have a high degree of elasticity when crosslinked in their helical state. The degree of elasticity, of course, varies with the type of crosslinking agent employed in forming the polymer, the proportion of crosslinking agent used in making the polymer, the proportion of non-helical molecular components in the polymer, and the proportion of polymeric polyol or polypeptide used in forming the product. Even though the degree of elasticity varies with the type of amylose produced, the elasticity is significantly greater than a film produced which is crosslinked in the random coil form and more elastic than films which have not been crosslinked. Films and fibers can be produced which have an elasticity from about 25%–200% and sometimes greater without permanent deformation.

The term "elasticity" is meant to refer to the ability of the fiber or film to substantially recover to its original size or length after it has been subjected to deformation. Conditions for measuring dry film elasticity include a temperature of from about 25°–30° C. and a relative humidity of 25–40%. The lengths of the sample are about 3 inches.

The films, fibers, and shaped articles of this invention can be prepared in a conventional manner. For example, films simply can be cast from a solution or dispersion of the polymer in a liquid vehicle or by spraying or dipping and the liquid vehicle removed. Filaments and shaped articles can be extruded or molded. In the manufacture of tubular sausage casings, for example, the dispersion is extruded as a tubular casing through an annular die into a coagulating bath consisting of ammonium or sodium sulfate. This permits the formation of a film which will retain its shape for further processing prior to crosslinking. Fibers can be prepared by extruding the slurry through a die into a coagulating solution. After coagulation, the resulting filaments are chopped into fibers of desired length.

The solutions or dispersions for forming the product as films or fibers and shaped articles can vary in concentration of polymeric material as desired. Generally, about 2–35% polymeric material is present in the dispersion or solution for making the various products. Usually for the manufacture of tubular films such as sausage casings, the concentration of amylose polymeric material is about 3–8% by weight of the composition.

As might be expected, dispersions or solutions of amylose may have a short shelf life because amylose has the characteristic or retrograding. Retrograding is a property of starch or amylose which relates to the formation of a water-insoluble material from a dissolved or hydrated state in a liquid vehicle. Generally, the solution or dispersion should not be formed more than about 10 hours and preferably 5 prior to use as retrogradation may be a problem. Secondly, if a crosslinking agent is present in the dispersion, it may react with the amylose molecules and inhibit the formation of the desired products.

The following examples are provided to illustrate preferred embodiments of the invention and are not intended to restrict the scope thereof. All percentages are expressed as weight percentages and all temperatures are in degrees Centigrade unless otherwise specified.

EXAMPLE 1

AMYLOSE CROSSLINKED WITH DIISOCYANATE-DMSO

A tubular casing of amylose is prepared by dispersing 50 g of corn-derived amylose sold under the trademark of "Napol-L" by A. E. Staley Co. in 150 g of commercial grade undried dimethyl sulfoxide. The resulting dispersion has a gray-green turbid appearance. After the dispersion is formed, it is allowed to stand for a period of about 24 hours to assure complete dissolution. The amylose molecule is in the helical conformation. Orientation should take place much sooner, e.g., at least in an hour. Dimethyl sulfoxide is selected as the liquid medium as a number of published articles indicate that amylose has a helical conformation therein at 25° C. Additional dimethyl sulfoxide is conducted in order to produce a dispersion containing about 5% amylose by weight which is then heated on a glycerol bath to about 70° C. for about one hour.

A 15 g portion of a cycloaliphatic diisocyanate, namely, methylene dicyclohexyl p,p′ diisocyanate sold under the trademark of Nacconate H-12, a trademark of Allied Chemical Corporation, is dissolved in 200 ml. of dimethyl sulfoxide. One hundred ml. of this solution is mixed with 1,000 g of the 5% amylose dispersion in dimethyl sulfoxide. The resulting mixture then is extruded through a conventional annular die of the type used for the manufacture of tubular casings for sausages.

The tubular casing as it is withdrawn from the die is heated by hot air to a temperature of about 160° C. for about 15 seconds to initiate crosslinking and gelation of the amylose molecule. Then the casing is cured at 95° C. for about 3 min. with the isocyanate group to set the casing. The casing is washed with water to remove excess DMSO in the casing.

The tubular casing thus obtained is highly elastic and can withstand an elongation of at least 50% in length and has sufficient strength for processing of sausages therein.

An elastic filament can be prepared by the above process by extruding through a hollow die instead of a tubular die.

EXAMPLE 2

AMYLOSE CROSSLINKED WITH DIISOCYANATE-DMSO

A highly elastic film from amylose is obtained by first dispersing a 100 g portion of a mixture of amylose and Nacconate H-12 in dimethyl sulfoxide as described in Example 1. This dispersion then is cast over a stainless steel plate. The plate is heated to about 95° C. to effect a reaction and crosslinking between the diisocyanate and the amylose molecule. After about 1½ minutes at 95° C., the films turn into a gel. On heating for another 3 minutes followed by water washing at 50° C. for about 10 minutes, a thin highly elastic film is obtained. Even after the film is dried, the film remains strong and elastic. When the dried film is rewet with water, it is even more elastic than when dry and does not undergo substantial deformation even after being stretched 100% from its original length.

EXAMPLE 3

AMYLOSE CROSSLINKED WITH DIISOCYANATE-DMSO

A 200 g portion of the 10% amylose (Napol L) dimethyl sulfoxide dispersion of Example 1 is charged to a vessel equipped with an agitator. Then, 2 g of Nacconate H-12 is added to the vessel and mixed therein. Films are cast from the resultant dope and heated to about 60° C. for about 3–5 minutes until the dispersion gels. The films are heated to a temperature of about 80°–85° C. for about 3 minutes to effect complete curing and crosslinking of the amylose with the diisocyanate. The films then are washed with hot water for removing the dimethyl sulfoxide.

Tensile strengths in the dry state measured on an Instron apparatus are about 12–14 pounds per inch for a film having a thickness of about 2–2½ mils. (The Instron machine is a standard apparatus used for measuring load and elongation of films.) When the films are rewet with water, a tensile strength of about 0.5 pounds per inch is reported. The films when elongated 200% and held in this state for 5 minutes shows no substantial change in load. This aspect indicates that there is substantially no change in the film structure and no permanent deformation at this loading.

EXAMPLE 4

AMYLOSE CROSSLINKED WITH DIISOCYANATE-WATER

A 150 g portion of a 10% amylose (Napol L) dispersion in 7.5% sodium hydroxide is diluted to a concentration of 5% by addition of water and then acetic acid is added to the dispersion to adjust the pH to about 5.5. The pH is reduced below 7 to permit reorientation of the amylose molecule from the random coil to the helical form. After this resultant colloidal dispersion is formed and aged, 5 g of a $C_{36}$ dimer acid diisocyanate is mixed with the amylose solution. The dispersion then is cast as a film on a plate and the film dried and cured at a temperature of about 120° C. The resulting film has a light yellow cast and a waxy surface. On inspection, the film does not appear to be highy elastic or extendable even when wet with water. This example demonstrates that the desired crosslinking of the amylose is now obtained in a solvent system where the crosslinking agent is substantially insoluble.

EXAMPLE 5

AMYLOSE XANTHATE CROSSLINKED DICHLOROPROPANOL-WATER

Alkali (sodium) amylose xanthate is prepared by charging 100 g of amylose (Napol L), 200 g of ice, and 400 g of aqueous 22% sodium hydroxide to a closed vessel equipped with an agitator. Then, under constant agitation, 16 g of $CS_2$ is charged to the vessel. A 300 g portion of water is added and the contents agitated for about 45 minutes. The temperature is maintained between 25° and 30° C. After one hour of mixing, the xanthate sulfur content is approximately 4.7% basis the amylose and after about 1½ hours the xanthate sulfur content is about 4.67%. At this point, the reaction is deemed to be complete.

The above mixture contains about 10% by weight of alkali amylose xanthate. A 30 ml. portion of this mixture is cast as a film onto a glass plate and allowed to dry at room temperature. After the film is dried, air at 40° C. is passed over the plate surface to make sure the film is completely dried. The resulting film obtained after forced drying is brittle even when rewet with water. The appearance of the film when dry is somewhat glassy and crumbles when subjected to stress.

A 300 ml. portion of the above 10% alkali amylose xanthate solution and 0.72 g of 1,3 dichloropropanol-2 is added to a vessel. The pH of the mixture is from about 8-9. (Reports in the literature indicate that amylose has a random coil molecular conformation in water when the pH is above 7.) The level of crosslinking agent (DS) is about 0.06 per monomer unit. A 30 ml. portion of this mixture is cast as a film on a glass plate and allowed to dry at room temperature. Then, the film is further dried by passing hot air (105° C.) over the film to effect crosslinking of the dichloropropanol and the amylose xanthate. The resulting film is brittle in both the dry state and in the rewet state. It is believed the brittleness is caused by the substantial crosslinking of the amylose molecule when in the random coil conformation as opposed to the helical conformation.

A 300 ml portion of the alkali amylose xanthate solution described above is added to a vessel. Under agitation, glacial acetic acid is added to the vessel drop-wise to reduce the pH of the mixture to about 6. Reports from the literature indicate that amylose is substantially in the helical conformation in water when the pH is at 6). Then, 0.72 g of 1,3 'dichloropropanol-2 is added to the vessel and then the resulting mixture is cast as a film on a glass plate. The level of crosslinking agent is sufficient to give a crosslink of about 0.06 per amylose monomer unit. The film is first permitted to dry at room temperature and then heated by hot air (55° C.) to further dry the film and effect cure between the dichloropropanol and the amylose molecule. The resulting film possesses a moderate amount of elasticity. A visual inspection indicates the percent elongation to be between about 25 to 50%. It is substantially more elastic than the crosslinked amylose xanthate film formed under alkaline condition and the non-crosslinked amylose film.

EXAMPLE 6

STARCH XANTHATE CROSSLINKED $I_2$-WATER

A 20 g portion of pearl starch xanthate having an amylose content of about 35% by weight and a xanthate sulfur content of 3.5% is dispersed into 200 g of water. This proportion should give a crosslink ratio of about 1 crosslink per 15 monomer units. The pH of the resulting dispersion then is reduced to about 6 by addition of acetic acid. (The amylose component should reorient to the helical form reduction of pH to 6 whereas the amylopectin component in the starch will remain as a random coil.)

A 100 g portion of the dispersion of pH 6 and 100 ml. of 0.1 N iodine in KI is added to a vessel and agitated to form a slurry. A portion of this slurry then is cast as a film on a Teflon substrate and another portion cast as a film on a glass substrate. Neither film on the Teflon or glass substrate is coherent. Further, the film is brittle.

A second 100 g portion of starch xanthate is added to a vessel and a 0.1 N iodine solution in KI is added dropwise to the vessel over a 35-minute period. About 30 mls. of iodine solution is added after the end point is reached. The resulting solution then is cast onto a glass plate and permitted to air dry. The film is brittle when dry and slightly elastic when wet with water.

It is believed that brittleness of the above film is due to the following reasons. In the formation of these films, two reactions are simultaneously taking place and competing against each other, one is the alignment of the iodine molecule (presumably as $I^-_3$ or $I^-_5$) in the center of helix of the amylose molecule and the other is the oxidation of the xanthate group to form a xanthide crosslink. Assuming that both reactions take place then one might achieve greater elasticity if the iodine were removed from the center of the helix. (This is substantiated in Example 7, below.) This would permit contraction of the "miniature springs" during load. Secondly, employing a material having a higher amylose content and lower crosslink ratio, e.g., 1 per 25-50 monomer units, should improve elasticity.

EXAMPLE 7

AMYLOSE XANTHATE-IODINE COMPLEX-WATER

An 88 g portion of potato amylose is dispersed into 500 g of water by mixing with a high speed agitator at a temperature of 25° C. A 200 g portion of 22% sodium hydroxide in water is added to the vessel and mixed to form a 10% solution of alkali amylose in water. The alkali amylose is converted to amylose xanthate having 3.5% sulfur content in the same manner as in Example 5.

Three films of 22 mil wet thickness are formed on a glass substrate from the above amylose solution and coagulated by immersing the coated glass substrate into a 30% ammonium sulfate solution in water for about 15 minutes. On coagulation, a white turbid film results. The film then is washed with tap water to remove any ammonium sulfate coagulant. A portion of this film then is removed for use as a control.

Each film then is placed into a 0.1 N iodine solution in KI for about 15 minutes to permit formation of the iodine complex with the amylose helix and to create a xanthide crosslink. The iodine complex when formed indicates that the amylose molecule is present in the helical conformation. These films both in the dry and wet stage are substantially inelastic and have essentially the same properties with respect to brittleness as the control film.

To determine if the iodine complex in the center of the amylose helix does inhibit contraction of the spring and result in reduced elasticity of the amylose polymer, the following procedure is performed. Sodium sulfite crystals are ground in a mortar with a pestle, sifted through a 200 mesh sieve, and the sifted (sodium) sulfite powder deposited over the moist amylose film to reduce the iodine and remove it from the interior of the helix. After a few minutes, the film becomes clear, indicating that the iodine has been removed. The resulting film in both the dry and wet state is substantially more elastic than the control film and the film having the iodine complex with the amylose. In fact, as much as 50% increase in elasticity is obtained in the film. This test does indeed show that (1) the amylose is present in the helical confirmation due to the presence of the iodine complex and (2) that the iodine complex inhibits contraction of the polymer thereby causing the film to be inelastic.

EXAMPLE 8

AMYLOSE-BUTANOL COMPLEX CROSSLINKED WITH DIISOCYANATE

A 16 g portion of corn amylose and 25 ml. N-butanol is added to a vessel. Then, about 160 g of water is added to the vessel and the contents heated to about 90° C. The resulting slurry is cloudy.

Films of about 4 mils thickness are made by pouring the slurry onto steel plates and drying at a temperature of about 100°-110° C. The resulting film when subjected to stress are brittle but are bendable to about 40° from the horizontal. (This procedure is essentially the same as that of Example 1 in U.S. Pat. No. 2,656,571.)

A 1.3 g portion of Nacconate H-12 is added to a 160 g of a 10% solution of amylose complexed with butanol and water. This level of crosslinking agent is sufficient to provide a crosslink ratio of about 1 per 60 amylose monomer units. Films are prepared by pouring the slurry on stainless steel plates and drying at a temperature of about 90° C. The resulting films both in the dry and wet state are substantially more brittle than the previous films described above. This result is believed to be due to the presence of the butanol complex in the amylose helix thereby inhibiting contraction of the polymer springs in much the same manner as iodine did.

To determine if elasticity of the polymer could be improved, the films are washed with hot water to remove the butanol complex. After substantial washing, the butanol is removed and the films re-evaluated for elasticity. These films in both the wet state and dry state are substantially more elastic than the crosslinked and butanol complexed film and also the non-crosslinked butanol complexed film. It is estimated that the elasticity of the film inasmuch as 50% greater than the non-crosslinked complexed film.

EXAMPLE 9

AMYLOSE CROSSLINKED WITH MALEIC METHYLVINYL ETHER COPOLYMER-DMSO

A 10% amylose solution in DMSO is made by dissolving 10 g of amylose in 90 g of dimethyl sulfoxide. A 6% solution is made of a polyfunctional polymeric anhydride (a copolymer of maleic anhydride and methylvinyl ether sold under the trademark of Gantrez AN-139 by GAF Corporation) in dimethyl sulfoxide.

A 10 g portion of the 6% Gantrez solution is mixed with a 100 g portion of the 10% amylose solution. Films of 50, 30 and 22 mls. in thickness are cast on a glass substrate and allowed to set for a period of about two hours. After setting, the films are heated to a temperature of about 100° C. on a hot plate. After the material has been heated to effect crosslinking between the maleic anhydride adduct and the amylose molecule, the films are washed with water to remove residual dimethyl sulfoxide. The films, when inspected, are highly elastic and can be stretched at least 50% from their original state without breaking.

Control films are made by casting two film sets; one of the Gantrez polymer from the 6% Gantrez solution in dimethyl sulfoxide and the other of amylose from the 10% amylose solution in dimethyl sulfoxide. Both of the films are heated to a temperature of 100° C. and then washed with water. Each film is glassy in appearance and extremely brittle.

EXAMPLE 10

AMYLOSE CROSSLINKED WITH GLYOXAL

A 100 g portion of a 10% dispersion of amylose in dimethyl sulfoxide is prepared as in Example 8 and added to a vessel. A 3 g portion of a 30% solution of glyoxal in water then is added to the vessel. Films are cast on glass and stainless steel substrates by pouring the dispersion over the substrates. The films then are heated to a temperature of about 100° C. for about 20 minutes to effect crosslinking between the glyoxal and amylose. After a 20-minute period, the films are washed with water to remove residual dimethyl sulfoxide. The resulting films are highly elastic when wet with water but are moderately brittle in the dry state. However, they are substantially more elastic in both the wet and dry state than control films made by casting the amylose-dimethyl sulfoxide dispersion on the respective substrates and drying.

EXAMPLE 11

STARCH CROSSLINKED WITH DIALDEHYDE STARCH

A 100 g portion of pearl corn starch having from 27–30% amylose is dispersed in 2000 g water by boiling. The pH of the dispersion is reduced to 6 by addition of hydrochloric acid. Then, 40 g of a 5% dialdehyde corn starch solution is added to the starch dispersion and blended therein (roughly 1 crosslink per 50 monomer units). Films are cast on glass plates by pouring the dispersion over the substrate. The films then are heated to about 50° C. by warm air and cured for about 24 hours at this temperature. The films are continuous but are extremely brittle in the dry state. When the dried films are moistened with water, the films still remain extremely brittle and undergo substantially no elongation before breaking.

EXAMPLE 12

AMYLOSE CROSSLINKED WITH DIALDEHYDE STARCH

A 100 g portion of amylose is dispersed in 2,000 g water in the same manner as the pearl starch is dispersed in water in Example 11. After the amylose is dispersed, the pH of the dispersion is reduced to 6 by addition of hydrochloric acid. Then, 40 g of a dialdehyde corn starch solution identical to that of Example 11 is added to the amylose dispersion and blended. The resulting dispersion is poured over glass substrates to form a film. The films are dried by passing hot 50° C. air over the surface and then the films are subsequently crosslinked by permitting to cure at such temperature for additional 24 hours.

The resulting film is continuous and more elastic than the starch film of Example 11, both in the dry and wet state. The film can be stretched slightly without breaking or undergoing permanent deformation. On the other hand, both the dry and wet films of the starch crosslinked with dialdehyde starch are brittle. It is believed the elasticity of the amylose film is due to the high concentrations of amylose whereas the starch is inelastic because of the high proportion of amylopectin.

EXAMPLE 13

AMYLOSE-POLYVINYL ALCOHOL IN DMSO

A 10% solution of amylose in dimethyl sulfoxide is prepared by adding 10 g amylose to 90 g dimethyl sulfoxide and agitating. A 2.2 g portion of solid powder polyvinyl alcohol is added to the 100 g portion of 10% amylose solution and mixed at a temperature of 40° C. for about 1 hour. Then, 0.6 g of Nacconate H-12 is added to the dispersion of amylose-polyvinyl alcohol in dimethyl sulfoxide. Films are prepared by casting the dispersion onto glass plates and heating in an over at 130° C. for about 20 minutes. This permits crosslinking of the amylose and polyvinyl alcohol with the Nacconate H-12 crosslinking agent. The films are washed with water and then removed from the glass. Removal of the films from the glass substrate is difficult due to the excellent adhesion of the film. The wet gel films are much less elastic than corresponding amylose films prepared in the absence of any polyvinyl alcohol and an elongation at break of about 60% is noted. Further, there is poor recovery of the film to its original state on reduction of the load. On the other hand, rewet crosslinked amylose films having no polyvinyl alcohol present have a 150–225% elongation at break. The film strengths of the amylose-polyvinyl alcohol, however, are higher than the 0.5–0.6 pounds per inch strength of a wet 2 mil thick amylose film.

EXAMPLE 14

AMYLOSE-POLYALLYL ALCOHOL IN DMSO

A 2 g portion of solid polyallyl alcohol is added to a 100 g portion of a 10% solution of amylose in dimethyl sulfoxide. To this solution is added 1 g of succinic acid for crosslinking the amylose-polyallyl alcohol components to form a film. This level of succinic acid provides for about 1 crosslink per 130 monomer units of amylose and polyvinyl alcohol. Films are cast on glass plates and the resulting films heated in an oven at a temperature of about 130° C. for 20 minutes to effect crosslinking of the film. The dry films are substantially less elastic than are corresponding amylose films crosslinked with the same crosslinking agent and at the same level of addition. On the other hand, they are about 50% more elastic than corrresponding amylose films prepared in the absence of a crosslinking agent and also the films prepared under conditions in which the amylose is not in the helical state.

EXAMPLE 15

AMYLOSE-CELLULOSE IN DMSO

A 100 g portion of a 10% solution of amylose in dimethyl sulfoxide is prepared. Then, 2 g of a low D.P. (350) cellulose xanthate (U.S. Pat. No. 3,399,069) is mixed into the dispersion of amylose and dimethyl sulfoxide. After the cellulose xanthate is fully dispersed a 15 g portion of a 1.7% solution of dialdehyde starch in dimethyl sulfoxide is added to the dispersion. Films of 15 mil. thickness are cast onto glass plates and then heated to a temperature of 70°–80° C. for about 1 hour. All of the films are soft and tacky to the touch. When they are washed with water for removal of dimethyl sulfoxide and then heated to about 100° C. the films are substantially less tacky to the touch. These resulting films are highly elastic in the wet state which is somewhat surprising in view of the relatively large amount of cellulose present in the films. These films are appreciably stronger in the wet strength then corresponding amylose films crosslinked with a dialdehyde starch.

The same process for prearing amylose-cellulose films is followed as noted above except that 1.5 g of Nacconate H-12 is substituted for the 15 g portion of dialdehyde starch. These films are highly elastic and have appreciable strength as compared to pure amylose films.

EXAMPLE 16

AMYLOSE-GELATIN IN DMSO

A 10 g portion of amylose is dispersed in 90 g of dimethyl sulfoxide. To this dispersion a 3 g portion of gelatin is added. The resulting dispersion is heated to about 30° C. in order to completely disperse the gelatin. After complete dispersion, 1.2 g of Nacconate H-12 is added to the dispersion and blended therein. Films of about 15 mils. in thickness are cast on glass plates and then heated at a temperature of about 100° C. in order to effect curing and crosslinking of the amylose and gelatin. The resulting films are highly elastic, both in the dry state and in the wet state. Of course, the films are more elastic in the wet state than in the dry state. But surprisingly, the films with about 30% water content were extremely flexible and elastic and undergo very little permanent deformation at a 100% elongation.

EXAMPLE 17

AMYLOSE-POLY GAMMA BENZYL L GLUTAMATE IN DMSO

A 10 g portion of amylose is added to 90 g of dimethyl sulfoxide to form a dispersion. Then, 6 g of poly gamma benzyl L glutamate (60% of the amylose content) is added to the dispersion and blended therein. It is reported in the literature that poly gamma benzyl L glutamate has a helical conformation in dimethyl sulfoxide. Thus, it is believed that if the reports in the literature are true then the amylose films should be highly elastic.

To the dispersion of amylose and poly gamma benzyl L glutamate in dimethyl sulfoxide is added 1.5 g of Nacconate H-12. Films are cast from the resulting solution and air dried at a temperature of about 40° C. Continued drying is employed to effect curing between the Nacconate H-12 crosslinking agent and the amylose and poly gamma benzyl L glutamate molecules. The resulting films are extremely flexible and can undergo substantial elongation without breaking. When other polymers which are not capable of the helical conformation, e.g., amylopectin or cellulose, are employed, brittle films are obtained at this level of crosslinking agent.

EXAMPLE 18

AMYLOSE-POLY GAMMA L LYSINE IN DMSO

When the process of Example 17 is repeated, substituting poly gamma L lysine in place of the poly gamma benzyl L glutamate elastic films are obtained. Like the poly gamma benzyl L glutamate amylose films, those poly gamma L lysine amylose films are more elastic than corresponding films crosslinked with Nacconate H-12 of amylose and cellulose and amylose and polyvinyl alcohol.

EXAMPLE 19

AMYLOSE-HYDROXYMETHYL NYLON 6 IN DMSO

A 2 g portion of hydroxymethyl nylon 6 is added to a 100 g portion of a 10% dispersion of amylose and dimethyl sulfoxide. Then, 0.5 g of acrylic acid and 0.05 g benzene sulfonyl chloride (photosensitize) is dispersed therein. Films are cast from the resulting dispersion to a thickness of about 30 mils. The films are air dried at a temperature of about 30° C. and to effect reaction between the carboxyl group and the hydroxyl group. After the films are dried, the film is exposed to a high intensity ultraviolet light for 10 seconds in order to effect crosslinking between the molecules by means of unsaturation in the acrylic acid monomer. The resulting films are elastic both in the wet and dry state.

I claim:

1. A process for forming films, filaments, and shaped articles from amylose and amylose derivatives having improved elasticity which comprises:

forming a mixture of a liquid vehicle and amylose or amylose derivative under conditions in which the molecular conformation of said amylose or amylose derivative is substantially in the helical form, forming said film, filament, or shaped article from said mixture, and crosslinking said amylose or amylose derivative while in the helical form with a crosslinking agent, said agent being present in a proportion for providing an average of about 1 crosslink per 500 monomer units of said amylose or amylose derivative to about 1 crosslink per 10 monomer units in said amylose or amylose derivative.

2. The process of claim 1 wherein said process is for tubular artificial sausage casings.

3. The process of claim 2 wherein said amylose includes not more than 30% of a polymeric polyol or a polypeptide in nonhelical conformation.

4. The process of claim 3 wherein said crosslinking agent has at least 3 carbon atoms in the structure.

5. The process of claim 4 wherein the functional group of said crosslinking agent is selected from the group consisting of an anhydride, a dicarboxylic acid, an aldehyde, an epoxide, an acyl halide, and an isocyanate.

6. The process of claim 5 wherein said liquid medium is water and acid having a pH below about 7.

7. The process of claim 5 wherein said liquid medium is one that can form a complex with amylose.

8. The process of claim 7 wherein said liquid medium is of the formula $RR_1SO$ wherein R is methyl and $R_1$ is hydrogen or methyl.

9. The process of claim 8 wherein said crosslinking agent is a linear polymer.

10. The process of claim 9 wherein said crosslinking agent is a diisocyanate.

11. The process of claim 10 wherein said diisocyanate is a cycloaliphatic diisocyanate.

12. The process of claim 1 wherein amylose xanathate is crosslinked by oxidation to xanthide crosslinkages while in the helical molecular form.

13. An elastic film which comprises amylose or an amylose derivative in substantially helical conformation crosslinked with an agent to provide crosslink sites in a proportion of from 1 crosslink per 500 monomer units to 1 to 10 monomer units.

14. A tubular sausage casing of the film of claim 13.

* * * * *